May 21, 1940.  W. D. SCHANCK ET AL  2,201,837
RELIEF VALVE
Filed March 24, 1939   2 Sheets-Sheet 1
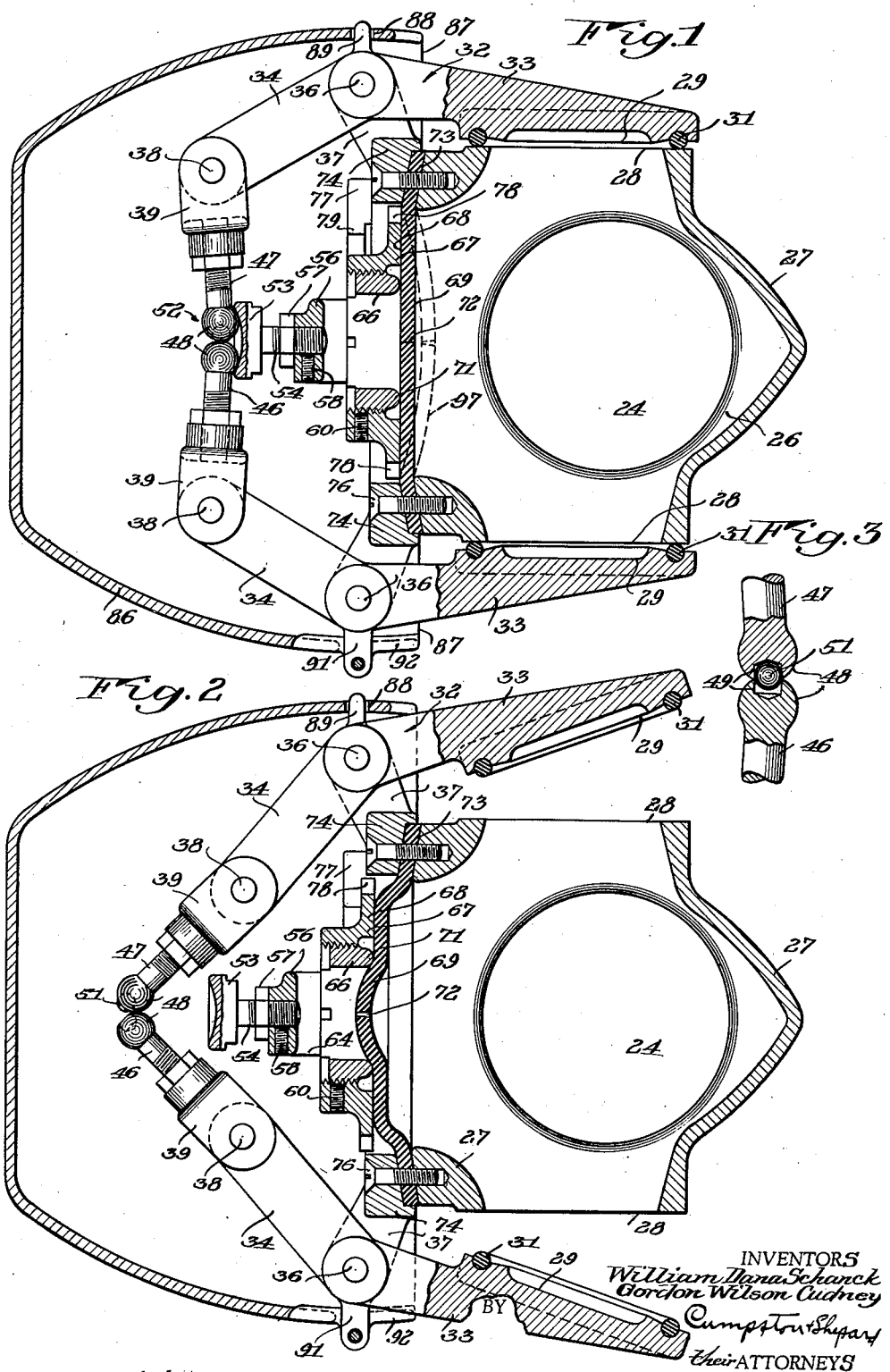

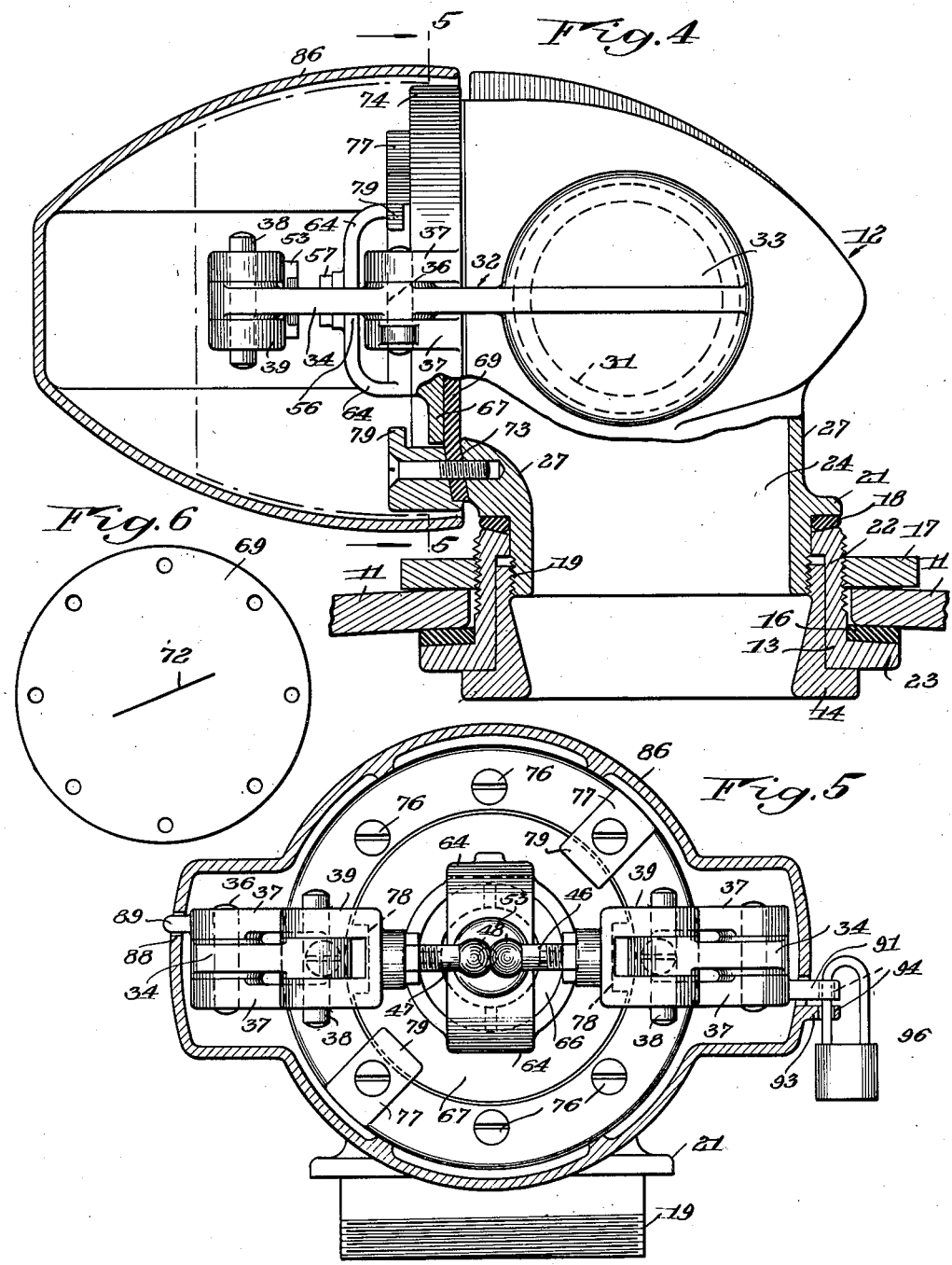

Patented May 21, 1940

2,201,837

UNITED STATES PATENT OFFICE 2,201,837

RELIEF VALVE

William Dana Schanck, Rochester, and Gordon Wilson Cudney, Bergen, N. Y., assignors to The Pfaudler Co., Rochester, N. Y., a corporation of New York Application March 24, 1939, Serial No. 263,950

9 Claims. (Cl. 277—3)

Our invention relates to relief valves. Reference is made to the copending applications of William Dana Schanck for "Relief valve", Serial No. 171,063, filed October 26, 1937, now Patent No. 2,166,730, granted July 18, 1939, and Serial No. 248,720, filed December 31, 1938, now Patent No. 2,189,084, granted Feb. 6, 1940.

An object of the invention is to provide a generally improved fluid relief valve which may be produced at a reasonable cost and which is more satisfactory in use.

Another object of the invention is to provide a generally more satisfactory fluid relief valve which is sensitive to either pressure or vacuum conditions in the pressure chamber.

Another object of the invention is the provision of a relatively simple combined vacuum relief, pressure relief, and fluid "blow out" valve, adapted particularly for application to a pressure tank, although capable also of other uses, to prevent vacuum or excessive pressure conditions therein.

A further object of the invention is to provide a more simple type of relief valve which is extremely sensitive so that when the pressure for which the valve has been set is reached, the relief ports will immediately "blow out" or snap to open position.

A further object of the invention is the provision of a simplified relief valve in which the magnitude or pressure at which the valve will open or "blow" can be readily changed and varied within relatively wide limits, and which when set to "blow" at a certain pressure will reliably function at the intended pressure.

Still another object of the invention is the provision of a simplified and generally more satisfactory fluid relief valve which will relieve the pressure at a predetermined point without rendering the valve inoperative so as to require resetting, the valve, however, being arranged to "blow" should the pressure in the pressure chamber increase to a second predetermined higher pressure.

Our invention further contemplates a simplified relief valve wherein the casing forms a pressure chamber, the operating parts being outside of the casing and enclosed by a shell locked to the casing against tampering with the operating parts, the shell, however, being readily removable to enable access to the operating parts for resetting, adjustment or repair thereof.

Other objects and advantages of the invention will be particularly pointed out in the claims, and will appear from the following description, when taken in connection with the accompanying drawings, in which:

Fig. 1 is a horizontal sectional view taken through the relief valve of our invention with the operating parts thereof in cocked position;

Fig. 2 is a view similar to Fig. 1 with the operating parts in inoperative position and the valve "blown;"

Fig. 3 is a detailed sectional view of a portion of Fig. 1 showing the arrangement of the toggle when set or cocked;

Fig. 4 is a vertical sectional view of the relief valve;

Fig. 5 is a view taken on the line 5—5 of Fig. 4;

Fig. 6 is a view of the diaphragm.

The valve of our invention is primarily intended as a combined vacuum relief, pressure relief, and fluid "blow out" valve. However, the principles thereof are applicable to a simple pressure relief valve. The valve is primarily intended to be attached to a tank to prevent the formation of a vacuum therein, and to prevent pressure within the tank from building up beyond a predetermined magnitude. When the pressure exceeds the pressure for which the valve is set, the diaphragm will open to relieve the pressure in the tank without the valve "blowing." However, should the pressure rapidly mount, or for any reason approach unsafe limits, at a second predetermined pressure the valve will quickly "blow" and relieve the pressure in the tank.

While the valve of our invention is particularly adapted for use with a pressure tank, it has of course other uses, particularly when the principles thereof are incorporated in a simple relief valve such as is used on pressure lines. Illustrative of its uses, the valve of our invention may be used on the tanks of a brewery. In brewery practice it is common to hold the beer under a certain predetermined pressure during a portion of the beer making process. If the pressure should accidently exceed the proper amount (as might happen, for example, if the pump were not shut down when the tank became full) then the tank might be damaged. Further, it occasionally happens that beer or other liquid is withdrawn from a closed tank by means of an outlet near the bottom thereof. If the opening of a vent has been neglected, or if the vent should clog, a vacuum may be created in the tank which may cause collapse or other damage to the tank.

The unitary valve of our invention may be attached to a tank adapted to contain a liquid under pressure. In the drawings we have indicated a wall of the tank by the numeral 11

(Fig. 4). Any suitable means may be provided for connecting the relief valve, generally indicated by the numeral 12, in fluid tight engagement with the tank. Such means may comprise a tank bushing 13, a locking sleeve 14, a gasket 16, a tank bushing nut 17, and a gasket 18. Since these parts constitute no part of our present invention, they need be no more particularly described than to say that the relief valve body or casing has a threaded end, as indicated at 19, adapted to receive the locking sleeve, and is also provided with a shoulder 21 between which and the tank bushing, the gasket 18 is confined. The locking nut 17 is threaded onto the tank bushing, as indicated at 22, and serves to hold the parts in assembled relation and confine the gasket 16 between a flange 23 on the tank bushing and the inner wall of the tank.

The valve is in free and open communication with the tank through an opening 24 which communicates with a chamber 26 defined by a valve body or casing 27. The casing 27 may be of any suitable shape and construction and preferably has two fluid "blow out" openings 28 (Fig. 1). The fluid "blow out" openings preferably face each other from opposite sides of the casing. The "blow out" openings 28 are covered each by a closure or cover plate 29. Each of the closures 29 is provided with a gasket 31, preferably of rubber and preferably cemented to the cover, which engages the circumferential lip of the fluid "blow out" opening 28.

Each of the closures is connected, preferably integrally, to a bell crank, generally indicated by the numeral 32. The arms of the bell cranks are indicated by the numerals 33 and 34. Each of the bell cranks has a pivot pin 36 extending therethrough adapted to receive the bifurcated arms of a lug 37. The lugs 37 are supported in a manner which will be presently described. The arrangement is such that the bell cranks may freely pivot on their respective pivot pins.

To the free end of the arm 34 of each of the bell cranks is pivoted, by means of a pin 38, a clevis 39. A pair of pressure arms 46 and 47 are adjustably threaded, one into each of the clevises. The pressure arms lie in the same plane and extend toward each other. The ends of the pressure arms 46 and 47 are preferably ball-shaped as shown at 48 (see Fig. 3). Each of the balls has a recess 49 therein, the recesses being circular in cross section and adapted to register with each other. A ball 51 is mounted in one of the recesses and has a portion of its surface extending beyond the surface of the ball-shaped end of the pressure arm in which it is mounted. The projecting end is adapted to engage in the other recess. The ball may be retained in the recess of the pressure arm in which it is mounted by peening over the circumferential rim or lip of the recess.

As will be noted from Fig. 1, the pressure arms 46 and 47 through their disengageable connection, formed by the ball 51, constitute a toggle, generally indicated by the numeral 52. The toggle, in Figs. 1 and 3, is shown in set, cocked, or pressure exerting position. The ends of the arms 46 and 47 are adapted to rest, when in a set position, upon a seat 53 having a threaded stem 54. The stem 54 is threaded into a cover extension 56 and is held in position in the extension by a nut 57 and a set screw 58. The cover extension 56 has a bridge 64 (Fig. 4) which is preferably integrally connected to an annular diaphragm cover 67. An annular ring 66 has external threads adapted to receive cooperating threads formed in the annular diaphragm cover 67. The ring 66 is adjustably held in position in the diaphragm cover by a set screw 69. The diaphragm cover 67 has an annular flat surface 68 which engages a diaphragm 69 while the annular ring 66 has an annular surface 71, rounded in cross section, which also engages the diaphragm.

The diaphragm 69 is preferably of flexible resilient and elastic material such as, for example, natural or artificial rubber, or rubber-like composition. Near its center the diaphragm, which may be circular or any other suitable shape, is provided with a slit 72. In making the slit in the diaphragm preferably no material is removed, but instead simply a cut is made through the diaphragm. The diaphragm 69 is held in position by clamping it between an annular surface 73 formed on the casing or valve body and an annular clamping ring 74. The clamping ring 74 is secured to the casing by a series of screws 76 (Fig. 5).

The clamping ring has a pair of ears or lugs 77 (Fig. 5) which lie on the side of the ring away from the diaphragm and project inward beyond the internal edge of the clamping ring. The ears are adapted to receive slots 78 formed on the diaphragm cover 67. The diaphragm cover 67, together with the annular ring 66 and the cover extension 56 may be assembled as a unit and placed in position with the slots 78 in registry with the ends 79 of the ears 77. The unit may then be moved inward beyond the ears and turned so that the ends 79 of the ears are out of registry with the slots 78. The unit is then capable of floating between the outer face of the diaphragm and the ends 79 of the ears 77. The lugs 37 which support the bell cranks are also carried by the clamping ring 74 so that all of the operating parts including the closures 29, the bell cranks 32, the pressure arms 46 and 47, and the diaphragm cover unit may be removed from the casing upon removing the screws 76.

The entire operating mechanism may be covered by a hood or shell 86 which may be of any suitable shape. The shell has an open end as shown at 87 and fits over the operating mechanism and a portion of the casing. The shell has a closed slot 88 adapted to receive a lug 89 formed, as viewed in Fig. 1, on the upper bifurcated arm 37 of the clamp ring 74. One of the lower bifurcated arms 37 (Fig. 1) has a lug 91 adapted to fit an open end slot 92 formed in the shell 86. A lug 93 on the shell is adapted to register with the projecting end of the lug 91 and apertures 94 are provided in the lugs for the reception of the hasp of a lock 96. The shell and lock serve to prevent tampering with the operating mechanism after the valve is once adjusted and set. The shell, however, may be readily removed by unlocking the lock and shifting the shell upward about the lug 89 as a pivot. When the shell has cleared the operating mechanism, the shell may be removed to enable access to the operating mechanism for setting the mechanism, adjustment thereof or repair.

It will now be appreciated that the relief valve of our invention is set for operation, in cocked pressure applying position, when the parts are in the position shown in Fig. 1. Let us now assume that a vacuum condition exists in the tank with which the chamber 26 is in communication. Since the shell is open and the outer side of the diaphragm is exposed to atmospheric pressure, a difference in pressure caused by the vacuum condition in the chamber 26 will cause the diaphragm to belly inward as shown in dotted lines at 97 (Fig. 1). When this occurs, the slit will open and air will be admitted to the tank until the pressure on opposite sides of the diaphragm is substantially the same. The valve thus acts automatically to prevent any vacuum condition in the tank such as is likely to occur if the tank is emptied of fluid through an opening adjacent the bottom of the tank without proper venting.

Let us now assume that a pressure condition exists in the tank. By adjusting the annular ring 66 with respect to the diaphragm cover 67 the pressure at which the slit will open may be controlled within limits depending upon the character and rigidity of the diaphragm. When this pressure is exceeded, the diaphragm bellies outward, as shown in Fig. 2, to relieve the pressure in the chamber 26, and hence the pressure in the tank. When the annular ring 66 is moved inward with respect to the diaphragm cover, the pressure required to open the slit 72 is increased, whereas the reverse occurs when the annular ring 66 is threaded outward with respect to the diaphragm cover. Such adjustment may be accomplished, after loosening the set screw 60, by rotating the annular ring 66 inward or outward with respect to the diaphragm cover 67.

The diaphragm slit is intended to relieve mildly excessive pressure conditions within the tank. That is, the diaphragm slit is set to open at a above that intended to be carried by the tank. That is, the diaphragm slit is set to open at a predetermined pressure, preferably somewhat above that intended to be carried by the tank. As soon as the pressure has been relieved, the diaphragm automatically moves back to the position shown in Fig. 1 and the slit is closed. Thus automatic relief of the pressure is obtained without requiring the resetting of the valve mechanism.

The amount of fluid which may escape through the diaphragm slit is relatively small due to the fact that the slit is relatively small and the diaphragm is constructed so as to withstand an appreciable pressure prior to the opening of the slit. Under certain circumstances, the pressure may rise rapidly in the tank and in the chamber 26 so that the slit is incapable of permitting the escape of fluid fast enough to bring the pressure within the chamber 26 down below the limit desired. When this occurs, the pressure in the chamber 26 will rise, despite the fact that the slit is open. This increase in pressure will gradually move the diaphragm cover 67 from the position shown in Fig. 1 to that of Fig. 2. This movement of the diaphragm cover causes a gradually increasing pressure on the toggle or pressure arms 46 and 47. The increase in pressure on the toggle gradually causes the toggle to assume an in-line position, and as soon as the pressure on the diaphragm is sufficiently great, will throw the toggle beyond its in-line position to a position somewhat as shown in Fig. 2.

The action of the mechanism is such, it will be appreciated, that the point of toggle "breakage" is critical. In the normal position of the parts shown in Fig. 1, a certain mechanical pressure is exerted holding the closures in covering relation to the fluid "blow out" openings. When the pressure on the diaphragm increases, the toggle is moved more nearly to an in-line position. This movement, because of the increased pressure of the toggle, increases the mechanical force holding the covers closed. Thus increased pressure within the chamber 26 causes an increase in the mechanical force holding the closures in closed position. As soon, however, as the toggle reaches an in-line position, a further slight increase in pressure "breaks" the toggle and the closures 29 "blow out" or are forced to an open position by the pressure of fluid within the chamber 26.

The pressure at which the closures will "blow out" may be adjusted by threading the pressure arms 46 and 47 into or out of their clevises and threading the seat 53 inward or outward with respect to the cover extension 56. For example, the toggle, may by thus adjusting the parts, be caused to assume a greater out-of-line position and, therefore, cause an increase in the force required to "break" the toggle. It will be appreciated that the pressure at which the valve will "blow" may be adjusted to a nicety and that as soon as this pressure is reached, the action will be substantially instantaneous. The action of the toggle is trigger-like in its sensitivity as soon as the predetermined pressure is reached. It will further be noted that the pressure of the fluid within the chamber 26 actually causes the "blow out" of the closures 29. The toggle and its associated mechanism serves as a mechanical pressure device for retaining the closures in closed position until the critical pressure is reached after which the toggle is "broken" or rendered inoperative.

The valve may be reset by removing the shell 86, moving the closures 29 to a closed position, and setting the toggle with the parts in the position shown in Fig. 1. This may be conveniently accomplished by a special wrench which need not be particularly described herein.

While we have shown our invention in connection with a combination vacuum relief, pressure relief, and fluid "blow out" valve, it will be appreciated that the toggle principle above described is applicable to the ordinary type of relief valve. Such a valve may be made by substituting, for example, a piston operating in a cylinder for the diaphragm and its associated parts. A valve thus constructed will "blow out" at a predetermined pressure in the same manner as above described, but will not be capable of relieving pressure without requiring resetting of the mechanism. Moreover, if desired, the closures 29 may be held in closed position by latches and these latches may be actuated by the toggle arrangement above described to cause opening of the closure. In addition, a single fluid "blow out" cover may be used, held in position by a toggle arrangement somewhat similar to that described above.

While we have shown and described the preferred form of our invention, it will be appreciated that various changes and modifications may be made therein, particularly in the form and relation of parts, without departing from the spirit of the invention as set forth in the appended claims.

We claim:

1. A relief valve of the type having a fluid pressure chamber with a fluid outlet and a closure for the outlet comprising, in combination, means including a toggle for maintaining said closure closed when normal fluid pressures exist in the chamber, a fluid pressure responsive device exposed to the fluid pressure in the chamber, and means actuated by said fluid responsive device for breaking said toggle when a predetermined fluid pressure exists in the chamber to thereby enable the opening of the closure to relieve the pressure in the chamber, said fluid pressure responsive device including a resilient diaphragm having a slit for normally relieving the pressure in said chamber at a pressure below said predetermined pressure.

2. A relief valve of the type having a fluid pressure chamber with a fluid outlet and a closure for the outlet comprising, in combination, means including a toggle for maintaining said closure closed when normal fluid pressures exist in the chamber, said toggle being so constructed and arranged as to increase the pressure holding said closure closed as the pressure in said chamber increases until a predetermined pressure is reached after which the toggle is quickly broken to enable said closure to open, a fluid pressure responsive device exposed to the fluid pressure in the chamber, and means actuated by said fluid pressure responsive device for breaking said toggle when said predetermined fluid pressure exists in the chamber, said fluid pressure responsive device including a resilient diaphragm having a slit for normally relieving the pressure in said chamber at a pressure below said predetermined pressure.

3. A relief valve comprising, in combination, a fluid pressure chamber having a pair of fluid outlets, a pair of closure members one for each of said outlets said closure members opening outwardly with respect to the chamber, means including a mechanical pressure device for maintaining said closures closed when normal fluid pressures exist in said chamber, a fluid pressure responsive device exposed to the fluid pressure in said chamber, and means actuated by said fluid pressure responsive device for rendering said mechanical pressure device inoperative when a predetermind pressure exists in said chamber to thereby enable the simultaneous opening of said closures to relieve the pressure in said chamber.

4. A relief valve comprising, in combination, a fluid pressure chamber having a pair of fluid outlets, a pair of closure members one for each of said outlets opening outwardly with respect to the pressure chamber, a mechanical pressure device including a toggle for maintaining said closures closed when normal fluid pressures exist in said chamber, a fluid pressure responsive device exposed to the fluid pressure in said chamber, and means actuated by said fluid pressure responsive device for breaking said toggle when a predetermined pressure exists in said chamber to thereby enable the simultaneous opening of said closures to relieve the pressure in said chamber.

5. A relief valve comprising, in combination, a fluid pressure chamber having a pair of fluid outlets, a pair of closure members one for each of said outlets opening outwardly with respect to the pressure chamber, means including a mechanical pressure device for maintaining said closures closed when normal fluid pressures exist in said chamber, said mechanical pressure device being so constructed and arranged as to increase the mechanical pressure holding said closures closed as the pressure in said chamber increases, a fluid pressure responsive device exposed to the fluid pressure in said chamber, and means actuated by said fluid pressure responsive device for rendering said mechanical pressure device inoperative when a predetermined pressure exists in said chamber to thereby enable the simultaneous opening of said closures to relieve the pressure in said chamber.

6. A relief valve comprising, in combination, a casing forming a fluid pressure chamber having a pair of fluid outlets, a pair of closure members one for each of said outlets, a bell crank connected to each of said closures, said bell cranks being pivoted to the casing, an arm pivoted to each of said bell cranks, said arms extending towards each other and forming a toggle which when normal pressures exist in the chamber is cocked, and a fluid pressure responsive device exposed to the fluid pressure in said chamber, said fluid pressure responsive device being arranged so as to exert pressure on the toggle to break the same when a predetermined pressure is reached in said chamber.

7. A relief valve comprising, in combination, a casing forming a fluid pressure chamber having a pair of fluid outlets, a pair of closure members one for each of said outlets, a bell crank connected to each of said closures, said bell cranks being pivoted to the casing, an arm pivoted to each of said bell cranks, said arms extending towards each other and forming a toggle which when normal pressures exist in the chamber is cocked, and a fluid pressure responsive device including a resilient diaphragm having a slit exposed to the fluid pressure in said chamber, said fluid pressure responsive device being arranged so as to exert pressure on the toggle to break the same when a predetermined pressure is reached in said chamber.

8. A relief valve comprising, in combination, a casing forming a fluid pressure chamber having a fluid outlet opening to atmosphere, a closure member for said outlet, said closure member opening outwardly with respect to the pressure chamber, a lever connected to said closure member and having a pivot point rigid with respect to the casing, a pressure responsive device exposed to the pressure in said chamber, and a toggle between said pressure reponsive device and said lever for normally holding the closure closed against the pressure within said chamber, said pressure responsive device acting on said toggle to shift the toggle from a cocked closure pressure exerting position through a dead center position to an uncocked inoperative position upon the pressure in said chamber rising above a predetermined magnitude.

9. A relief valve comprising, in combination, a casing forming a fluid pressure chamber having a pair of fluid outlets opening to atmosphere, a pair of closure members one for each of said outlets, said closure members opening outwardly with respect to the pressure chamber, a pair of levers one connected to each of said closure members and each having a pivot point rigid with respect to the casing, a pressure responsive device exposed to the pressure in said chamber, and a toggle having its ends connected to said levers and its center portion subjected to said pressure responsive device, said toggle and levers holding said closure closed against the pressure in said chamber and said pressure responsive device acting on said toggle to shift the toggle from a cocked closure pressure exerting position through a dead center position to an uncocked inoperative position upon the pressure in said chamber rising above a predetermined magnitude.

WILLIAM DANA SCHANCK.
GORDON WILSON CUDNEY.